(12) United States Patent
Joseph et al.

(10) Patent No.: US 10,916,163 B1
(45) Date of Patent: Feb. 9, 2021

(54) LARGE-SCALE INFINITY OPTICS WINDOW FOR USE IN SMALL FACILITY PACKAGING APPLICATIONS

(71) Applicant: DISNEY ENTERPRISES, INC., Burbank, CA (US)

(72) Inventors: Daniel M. Joseph, Los Angeles, CA (US); Andrew J. Johnson, Burbank, CA (US); Gilles J. Martin, North Hollywood, CA (US); Harry B. Wykes, Manhattan Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/667,048

(22) Filed: Oct. 29, 2019

(51) Int. Cl.
| | |
|---|---|
| *G06F 1/00* | (2006.01) |
| *G09G 3/00* | (2006.01) |
| *G02B 3/08* | (2006.01) |
| *G09G 5/10* | (2006.01) |

(52) U.S. Cl.
CPC .............. *G09G 3/003* (2013.01); *G02B 3/08* (2013.01); *G09G 5/10* (2013.01); *G09G 2320/066* (2013.01); *G09G 2320/0686* (2013.01); *G09G 2320/10* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2015/0168125 A1* | 6/2015 | Arieli | G01B 9/02036 351/211 |
| 2018/0218481 A1* | 8/2018 | Evans | H04N 5/20 |
| 2019/0064530 A1* | 2/2019 | Lee | G02B 27/0179 |
| 2020/0323429 A1* | 10/2020 | Fercher | G02B 27/106 |

* cited by examiner

*Primary Examiner* — Michael A Faragalla
(74) *Attorney, Agent, or Firm* — Snell & Wilmer L.L.P.; Kent A. Lembke (57) ABSTRACT

A display system useful for achieving a wide field of view infinity effect. The system includes a frame assembly adapted for mounting on a wall of viewing space. The system includes a display element with a display surface. The system includes a magnifying lens supported within the frame assembly with a rear surface facing the display surface and with a front surface facing the viewing space. The rear surface of the magnifying lens is parallel to the display surface of the display element and is separated from the display surface by a separation distance less than a focal length of the magnifying lens, e.g., a value such that a ratio of the separation distance to the focal length is in the range of 0.169 to 0.254. The magnifying lens may be a Fresnel lens in the form of a planar plastic sheet manufactured to provide a flat spherical lens.

31 Claims, 6 Drawing Sheets

LARGE-SCALE INFINITY OPTICS WINDOW FOR USE IN SMALL FACILITY PACKAGING APPLICATIONS

BACKGROUND

1. Field of the Description

The present description relates, in general, to display systems configured to display content that includes objects and features that are at a great distance from the viewer or at infinity. More particularly, the description relates to a display system that provides a window or portal that can be mounted within a wall of a facility (or in a small packaging application with only a small amount of depth available) but yet provide an infinity effect for content displayed to a plurality of viewers in a room including the wall over a wide field of view.

2. Relevant Background

There are numerous applications where it is desirable to provide infinity optics or an infinity effect for displayed content. The "infinity effect" is an optical illusion that causes nearby images or displayed content to appear as if they go on forever or that some of the displayed objects are actually located at infinity or at a great distance from the viewer. The infinity effect is provided in flight simulators such as for training fighter jet pilots. However, the conventional infinity optics utilized require a great deal of space (e.g., 4 to 6 feet or more) to implement and are very costly. Additionally, the infinity effect achieved often has a very small field of view (fov) requiring the viewer's eyes to be located in a particular position relative to the infinity optics that cannot change over time or that is fixed (e.g., the pilot in training remains in a seat with a known head position throughout flight simulations).

Conventional infinity optics systems are impractical for use in applications where the space available for the optics is very limited. For example, it may be desirable to provide facilities that simulate interior cabins or spaces of a spaceship, of an underwater craft, and the like with windows or portholes that appear to display the surrounding space with objects or content at great distances from the windows or portholes through the use of the infinity effect. To be effective, the windows need to look as real and deep as space or an ocean feels. One limiting problems is that the display system providing the infinity optics window may have to be packaged to have a limited depth, e.g., 15 to 24 inches or the like. Further, the facility may have hundreds or more of such windows such that the cost per display system also has to be controlled.

As a result, existing display system designs are not useful in these facilities. For example, some have tried to solve this problem through the use of a liquid crystal display (LCD) or other display element, but these often only provide a theatrical look with no depth. Flight simulator infinity optics may use large toroidal reflectors that require many feet of space that cannot fit the small depth package of many facility walls, and flight simulator infinity optics presently are very expensive (e.g., $100K or more USD) so that they are not useful in facilities requiring numerous windows/portals each with an infinity effect. It is desirable that the content displayed in the window or porthole be visible over a wide fov by viewers that move about a room or space in the facility, and, hence, narrow fov designs such as infinity optics of flight simulators are not well suited for such applications.

SUMMARY

The inventors recognized that conventional infinity optics designs required too much space for use in small depth (e.g., 24 inches or less) applications, were too expensive for most applications, and had too limited of a field of view (fov) for providing the infinity effect to multiple viewers and/or to a viewer that may change their viewing position over time. In response, the inventors created a new display system that provides an infinity optics cabin window that can be wall mounted and requires relatively little depth (e.g., 20 to 24 inches or less) in contrast to prior designs that require significant actual depth to achieve an infinity effect. Significant trial and error and material testing was required to achieve a high quality infinity effect with the display system including a wide fov allowing a viewers to see the effect nearly anywhere in a room with the cabin window. Additionally, the new display system can be implemented at a relatively low cost that makes it useful in facilities with many cabins, rooms, or spaces each including one or more of such display systems.

More particularly, a display system is provided that is useful for achieving a wide field of view infinity effect. The system includes a frame assembly adapted for mounting on a wall of viewing space (such as a hotel room, a ship's cabin, and the like). The system also includes a display element with a display surface, and the display element operates to display an image upon the display surface. The system further includes a magnifying lens supported within the frame assembly with a rear surface facing the display surface of the display element and with a front surface facing outward into the viewing space when the frame assembly is mounted on the wall. The rear surface of the magnifying lens is parallel to the display surface of the display element and is separated from the display surface by a separation distance less than a focal length of the magnifying lens. Particularly, the separation distance may have a value such that a ratio of the separation distance to the focal length is in the range of 0.169 to 0.254.

In some embodiments, the magnifying lens takes the form of a Fresnel lens. In such embodiments, the Fresnel lens may be a planar plastic sheet manufactured/formed to provide a flat spherical magnifying lens. In such embodiments, the Fresnel lens may have a focal length of at least 47 inches and the separation distance may be less than 12 inches (e.g., 8 to 12 inches with a lens diameter of about 47.25 inches). In the same or other embodiments, the system may include an iris light assembly including a plurality of light sources provided in the frame assembly at locations about a periphery of the magnifying lens, and the light sources are operable to provide output light in a direction away from the display element.

In some preferred embodiments, the display element provides the image with a brightness of at least 1000 nits to achieve contrast (with some preferred space effect-type installations using display elements having a brightness of 3500 nits or greater), and the display element has a resolution of at least 4K to avoid having pixels readily visible when the display element is magnified by the magnifying lens. In some implementations, the display system includes a controller operating the display element to display the image based on input content defining a video image with at least one brightly lit and moving object. Further, the content may be adapted to concurrently display first regions or objects that are brightly lit and second regions or objects that are dark, whereby high contrast is provided in the image. In the same or other implementations, the controller may operate the display element to display the image based on input content defining a video image with a frame rate of at least 60 frames per second to reduce or eliminate flicker or an inchworm effect.

DETAILED DESCRIPTION

Briefly, a display system is provided that provides an infinity optics window that may be mounted on a facility or cabin wall with small back of house space (e.g., 20 to 24 inches or less depth). The display system has four main components including: a magnifying lens, a display element, a show set shroud or frame, and an iris light assembly, and these can be assembled into a package making to execute in many rooms or cabins of a facility in an economic manner. An important feature of some display designs is that the infinity effect or illusion was achieved in only 8 inches of depth (distance from magnifying lens to image source or display surface or screen of display element).

The display system is very cost effective because the magnifying lens may be implemented using a large-scale, high resolution Fresnel lens that can be relatively inexpensive (e.g., less than $1000 USD as compared to components of other designs such as use of optically-milled mirrors at $25,000 USD or more each). The display system may implement the display element using a high dynamic range liquid crystal display (LCD) or the like, with a high resolution (e.g., 4 k or greater resolution) combined with high brightness (e.g., at least about 1000 nits such as 3500 or more nits with one embodiment using a display with a brightness of 4000 nits) to achieve contrast useful in achieving a higher quality infinity effect. The magnifying lens may be implemented using a planar, high-resolution, large scale Fresnel lens that may be arranged parallel to the display surface of the display element and spaced apart at just the right distance (e.g., a separation distance in a range of acceptable distances that are all less than the magnifying lens' focal length) from the display surface or image source. This arrangement has been proven by the inventors during testing to provide a very convincing infinity optical effect.

The display can be relatively large scale, e.g., up to a 75-inch diagonal display element, or it may be scaled down. The bright contrast image (e.g., of space, of an undersea world, or the like) provided by the display element is preserved due to the optical characteristics of the Fresnel or other magnifying lens and the edges of the image roll off into infinity. The display system may further include an iris light assembly to provide a halo or iris light that surrounds the window opening that steps down a viewer's iris opening (or provides "irising") that when coupled with the optical effects of the display element and the magnifying lens makes for a very convincing infinity effect without requiring large depths (e.g., at depths in the range of 8 to 24 inches or the like).

Figure 1:
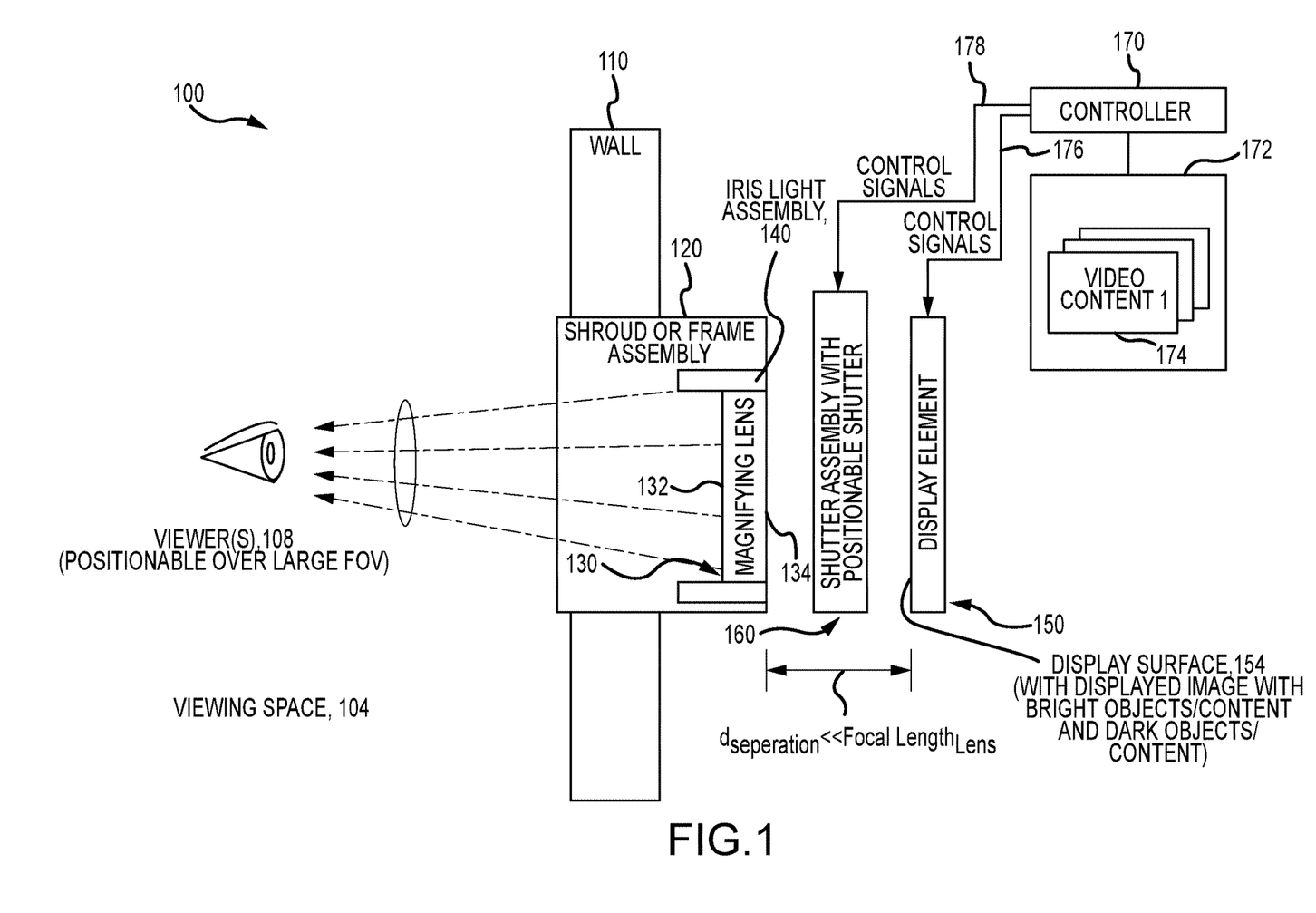
FIG. 1 is a functional block diagram of a display system for providing a window or portal for a room or cabin that displays imagery having an infinity optical effect with optics having a small depth profile.

FIG. 1 is a functional block diagram of a display system 100 for providing a window or portal for a room or cabin that displays imagery having an infinity optical effect with optics having a small depth profile or small installation space/package. For example, it may be desirable to mount a frame assembly and display components in an opening or hole in a wall of a room in which viewers are located such as within a hotel room, a cabin of a ship, and the like, and there may only be a small depth available for the entire display system (such as 2 feet or less in many cases). In this regard, the display system 100 is shown to include a shroud or frame assembly 120 that is mounted within an opening of a structural wall 110 defining a room or space 104 in which one-to-many viewers/observers are located with one viewer 108 shown for simplicity. The viewer 108 is not locked into a single viewing position (or eye box) but is, instead, able to move about the room/space 104 as the display system 100 is configured to provide a wide fov for the images having the infinity effect (as shown with arrows 155). In some cases, the fov is up to 180 degrees as the viewer 108 can observe the image 155 from nearly anywhere in the space 104 and still perceive a high quality infinity effect.

The shroud or frame assembly 120 is configured to structurally mate the display system 100 to the wall 110 and to support optical and/or lighting components used to achieve the infinity effect. Particularly, the frame assembly 120 supports a magnifying lens 130 and an iris light assembly 140. The magnifying lens 130 is selected to provide magnification of images displayed upon a display surface 154 of a display element 150, with a particular focal length, focal length$_{lens}$. The magnifying lens 130 may take a variety of forms to practice the system 100 such as nearly any single lens configuration including a large plastic, glass, or ceramic spherical lens (but, typically, not a sheet of lenslets). In some embodiments, though, the magnifying lens 130 is implemented as a planar magnifying lens such as a Fresnel lens, which can be formed relatively inexpensively in a sheet of plastic and with a large scale (e.g., 4 to 8 feet wide with one prototype using a 6-foot wide Fresnel lens manufactured for use in solar panels). In one useful prototype, the Fresnel lens took the form of a flat spherical lens with a diameter of 1200 millimeters (mm) or about 47 inches (and, due to the optical characteristics of Fresnel lenses, a matching focal length, focal length$_{lens}$), and the specific product number or model was the CF1200 available from NTKJ Co. of Japan.

The magnifying lens 130 is arranged to have a front surface 132 (e.g., with ridges of a Fresnel lens or a curve of a spherical lens) facing the viewing space 104 and viewer 108 and a rear surface 134 facing the display surface 154 of the display element 150. The magnifying lens 130 is generally arranged to be parallel to the display surface 154 (or with surfaces 132 and 134 of the lens 130 parallel to the display surface/screen 154). Significantly, the display element 150 is mounted in the system 100 (e.g., onto a support bracket on the rear of the frame assembly 120 or the like) with the display surface 154 a predefined distance, $d_{separation}$, from the back surface 134 of the magnifying lens 130.

Maximum magnification is achieved at the focal length of a lens, but the inventors discovered through significant trial and error and testing that higher artistic quality infinity effects are achieved when the distance, $d_{separation}$, is much less than the full focal length of the lens 130. In the example of a Fresnel lens 130 with a diameter and focal length of 1200 mm (or 47.25 inches), it was determined that the distance, $d_{separation}$, is preferably in the range of 4 to 16 inches an infinity effect and more preferably in the range of 8 to 12 inches to achieve a better (or even best) infinity effect in which images round off to sides and get proper motion over a wide fov (e.g., over the whole viewing space 104 for a viewer 108) as more parallax (left and right views) when the viewer 108 moves in space 104 so do not have to keep the viewer's head and eyes in a specific spot with display system 100. If greater magnification is used, as taught in some prior systems, the fov shrinks (which may be acceptable in a flight simulator or other setting with a fixed and/or single viewer 108). By not requiring the lens 130 at its focal length from the display surface 154, the display system 100 can be placed into a small depth space such as in wall 110 (less than 2 feet such as in range of 8 to 20 inches) rather than requiring 4 feet or more of space. Hence, the ratio of the distance, $d_{separation}$, to the focal length of lens 130 is typically in the range of 0.084 to 0.339 and more preferably in the range of 0.169 to 0.254, and it is believed that magnifying lenses with a wide variety of focal lengths may be used to implement the display system 100 as long as these ratios are utilized.

To enhance the effectiveness of the display system 100 in providing a desirable image 155, the display system 100 includes an iris light assembly 140 that is mounted within or on the frame assembly 120. Particularly, the iris light assembly 140 is designed to provide light about the periphery or outer perimeter of the magnifying lens 130 (or its front surface 132) that is projected or transmitted with the magnified light from the display surface 154 in light 155 provided to the viewer 108. For example, a strip of light sources or a plurality of elongated light sources may be positioned proximate to the outer edges of the front surface 132 of the magnifying lens 130 so as to face the viewing space 104. In some cases, these lights may take the form of light emitting diodes (LEDs) that are white or are colored and have a brightness chosen to achieve the irising effect without diminishing the quality of the image provided by the display element 150. This is useful because when a viewer 108 into a dark scene on display surface 154 it helps to have light provided about the perimeter as it causes the viewer's eyes to react by stepping down or shrinking the size of the iris opening in the viewer's eyes, which enhance contrasts within or with the presented dark image.

A shutter assembly 160 is provided in the display system 100 that is operable, in response to control signals 178 from a system controller 170, to move a shutter element. The shutter element may be opaque (or nearly so) and be positionable between the display surface 154 and the viewing space 104 such as between the magnifying lens 130 and the display element 150 as shown. The shutter element is used to hide the presence of the display element 150 when the display element 150 is not "on" or operating to display an image upon the display surface or screen 154, and this may be desirable as the magnifying lens 130 may be relatively transparent when light from the screen/surface 154 is striking the back surface 134 but be visible to a viewer 108 when the display element 150 is "off" or not displaying an image.

In some embodiments, the control signals 178 are generated in response to a viewer 108 selecting an "ON" or "UP" button on a control panel on a portion of the frame assembly 120 exposed to the room/space 104. The control routine or algorithm may involve powering on the display element 150 with control signals 176 and initiating display of video content 174 accessible to the controller 170 in memory/data storage 172 (or over a digital communications network). The control routine or algorithm implemented by the controller 170 may require that the shutter assembly 160 is only operated to move the shutter element away from the display surface 154 (to reveal or uncover the surface 154) after a predefined delay or time period has passed so as to ensure the display element 150 has warmed up and/or is at its full or desired brightness and/or that the content 174 has begun to stream to the display element 150 for display on surface 154. After this delay period has passed, the controller 170 may issue control signals 178 to raise (or move) the shutter element. An opposite process may be followed when a viewer 108 (or other initiating agent) requests that the window/portal be closed with the shutter element being lowered (moved) so as to be disposed between the display surface 154 and the viewing space 104 and with the display element 150 being powered down or display operations ended.

The display element 150 may take a wide variety of forms to implement the display system 100. In some applications, it is desirable for the display element to take the form of a high brightness display because a particular brightness or brightness level is preferred to obtain contrast to the viewer 108 so as to further enhance or achieve the infinity effect of the display system 100. For example, it was determined that a display element 150 with 8K resolution but only 1100 nit brightness provides a lower quality infinity effect due to lower perceived contrast then a display element with 4K resolution and 3500-nit brightness. This is especially true when the content 174 will include bright objects upon a dark background, e.g., stars and planets upon a deep space background, and it is desirable to have higher contrasts. Hence, the inventors have determined that a display with at least about 1000 nits higher brightness is often needed while a display element 150 with a 3500 nit minimum brightness being preferable for space effect-type display systems (note, a high brightness display may be defined as one with a brightness of at least 1000 nits).

In the same or other embodiments, it is desirable for the display element 150 to have a resolution that exceeds a minimum resolution for the display system 100 so that the pixels of the display element are not visible or are less visible under the magnification provided by the magnifying lens 130. In some implementations, it is desirable to use a liquid crystal display (LCD), an OLED, or the like with a resolution of 4K or higher (e.g., 4000 pixels or more). Experiments have shown that the pixels will be nearly invisible to the viewer 108 with a display element having 4K resolution and will be invisible at 8K or higher resolutions such that the minimum resolution of the display element 150 may be set at 4K.

The video content 174 may also be varied to practice the display system 100, but it may be useful to select media/content meeting several criteria to achieve a more artistically desirable infinity effect. First, it is useful that the digital content 174 be video or be configured for providing moving objects/imagery rather than a still image as at least slowly moving objects or images in the content 174 enhance the optical effect. Second, the content 174 may be chosen to concurrently include very dark zones and very bright (or brightly lit) zones or objects (such as stars upon the background of outer space). This is useful to obtain contrast and is useful with high brightness displays that often are configured with a zoned backlight in which zones of LEDs are operated to only be lit in areas of the screen 154 associated with the bright zones/objects in the content 174 and off to provide the dark zones/backgrounds. Third, it may be useful to achieve a high quality image with the magnifying lens 130 to choose an unconventional video rate. Particularly, it may be useful to choose a frame rate for the video content 174 that is at least about 60 frames per second to avoid pixel flicker or the inch worm of content from pixel to pixel in the image 155 perceived by the viewer 108 (whereas conventional video rates often are 29 to 30 frames per second).

Figure 2:
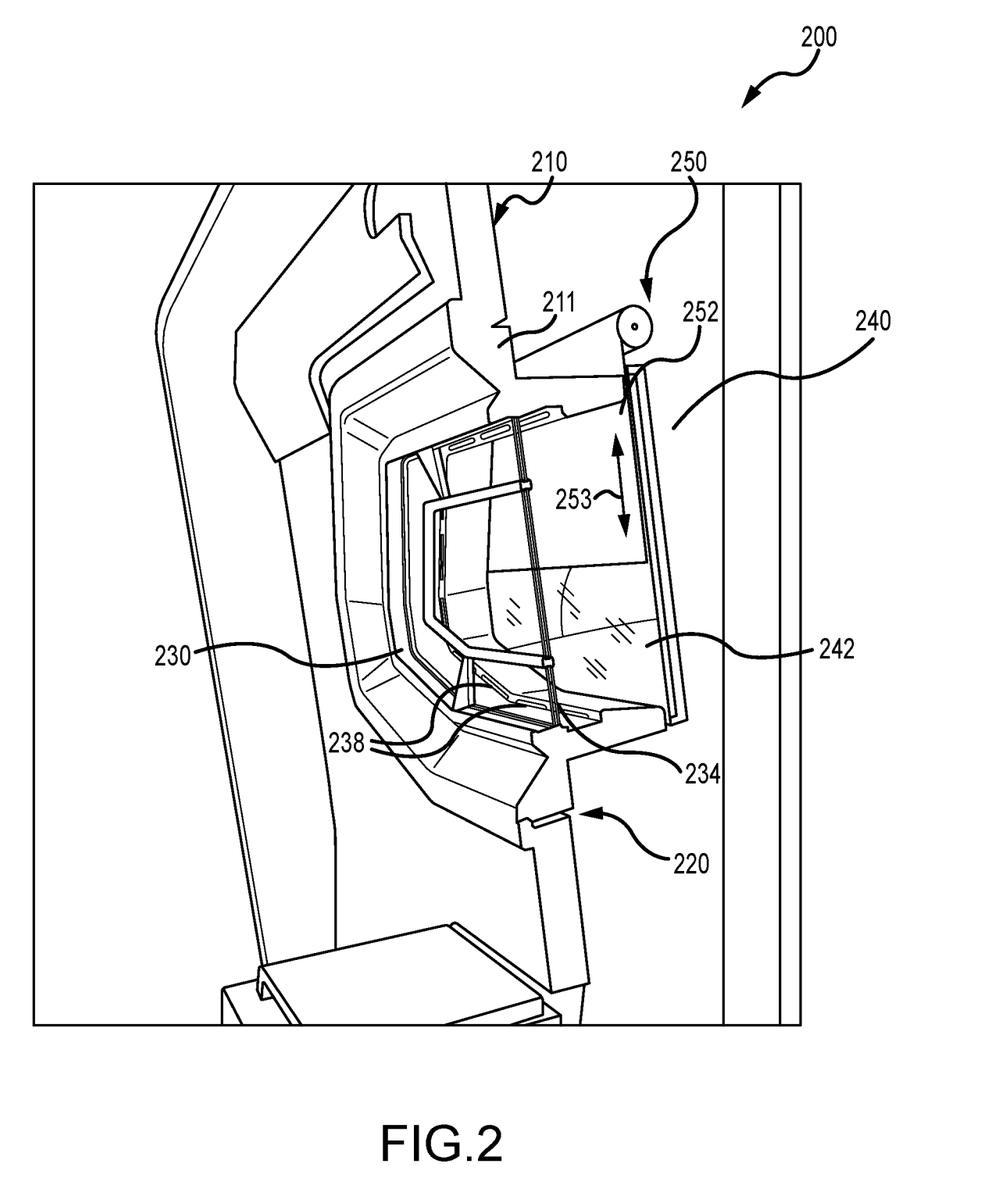
FIG. 2 illustrates a side sectional view of a display system during its operations to provide imagery with an infinity optical effect.

FIG. 2 illustrates a side sectional or cutaway perspective view of one embodiment of a display system 200 during its operations to provide an infinity effect. The display system 200 may include the components of system 100 and provide one useful implementation in a room or cabin to provide a window or portal to view outside the cabin (e.g., space in one example with the cabin being aboard a spaceship or space station). The cabin/room is defined in part by a structural wall 210 with an opening or hole 211. The system 200 includes a shroud or frame assembly 220 that is inserted into or received in the hole/opening 211 and then affixed to the wall 210.

The "window illusion" is provided in part by inclusion of clear window pane or non-magnifying outer lens 230 positioned centrally in the frame assembly 220, and the window pane (or panes) 230 may be fabricated from glass or other transparent (or somewhat translucent) material such as a hard plastic. The window pane 230 provides a clear view for observers to optical components behind the pane 230 or provides an unobstructed transmission path for light emitted or projected outward from such components.

Particularly, the display system 200 includes a magnifying lens 234 positioned inward from the window pane 230. The magnifying lens 234 is shown to be planar or flat and be supported in the frame assembly 220 to be parallel and spaced a short distance from the interior surface of the window pane 230 (such as 0.5 to 2 inches while other embodiments may have these two components abutting). As discussed above, the magnifying lens 234 may take the form of a Fresnel lens with a particular focal length (e.g., a lens formed in a plastic sheet or the like), and the lens 234 typically will be at as large as the window pane 230 (or have its edges disguised or hidden by frame assembly 220), with a width of 1 to 5 feet or more and a height of 1 to 4 feet or more.

Further, the display system 200 includes a display element 240, such as high brightness display in the form of an LCD with a resolution of at least 4K and a brightness of 1000 nits or more (or more even more preferably 3500 nits or more). The display element 240 is mounted on the frame assembly 220 with the display screen or surface 242 of the display element 240 facing the back or interior surface of the magnifying lens 234 and typically the surface 242 is parallel to the lens 234. Significantly, the magnifying lens 234 (or its back or interior surface) and the display screen or surface 242 are spaced apart a separation distance that is substantially less than the focal length of the magnifying lens such as within the ratio of the separation distance to the focal length falling in the range of the range of 0.169 to 0.254 (e.g., 8 to 12 inches with a focal length of 47.25 inches in one prototyped display system 200).

As shown, the display system 200 is in a state of operation in which an operator has requested the portal shutter to be opened or closed. In this operating state, a powered roll shutter assembly 250 is operating as shown with arrow 253 to raise (open shutter) or lower (close shutter) an opaque and flexible shutter element or sheet 252. This causes the shutter element 252 to be moved up and away from the surface 242 or to be moved down and in front of the surface 242. In this way, the display element 240 may be hidden from view to simulate a closed portal or window, and it may be revealed by operation of the shutter assembly 250 to show the display element 240 only when it is operating to display content (e.g., sharp contrast images with images of space with starts and planets shown in the example of FIG. 2). Further, the display system 200 includes a plurality of light sources 238 about the periphery or outer edge of the display element 240 that are disposed between the magnifying lens 234 and the display surface 242 of the display element 240. The light sources 238 are shown to be illuminated to cause human observer's irises to step down or close some amount to reduce the size of the iris opening to perceive more readily the dark content on display surface 242.

Figure 3:
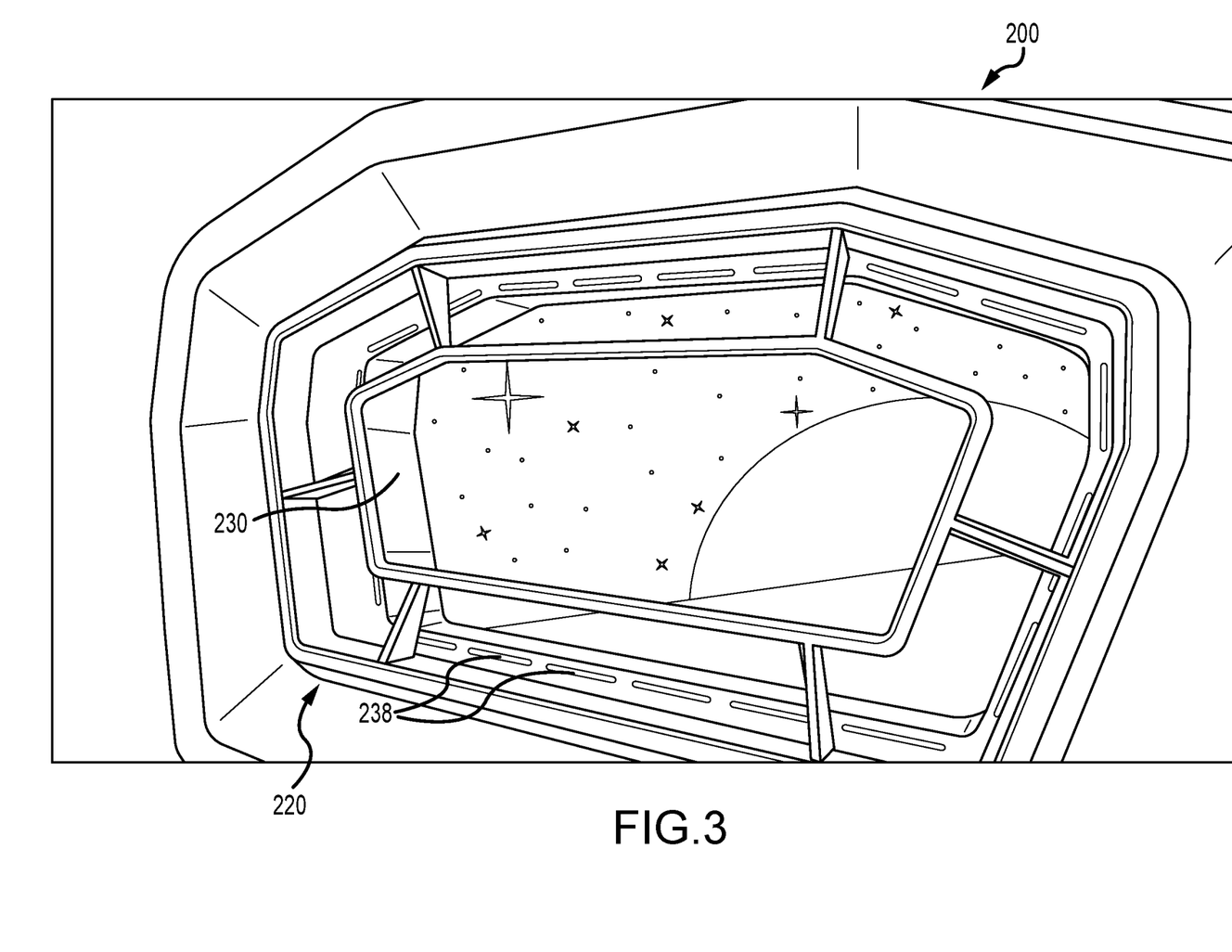
FIG. 3 illustrates a front view (or view as seen by a viewer/observer in the room/viewing space) of the display system of FIG. 2.

FIG. 3 illustrates the display system 200 of FIG. 2 after the shutter assembly 250 has completed shutter opening or raising operations to fully reveal the operating display element 240. The lights 238 are operating to provide an irising effect, and the clear/non-magnifying pane 230 allows the content on the display screen 242 to be perceived and/or viewed. As shown and discussed with reference to FIG. 1, the content includes dark zones/objects next to bright zones/objects, and typically the bright objects/zones are not still but are in motion (e.g., at least slowly move across the screen/surface 242). In FIG. 3, the display system 200 is shown as it would be observed by a viewer (not shown) who may move about the room/cabin that the pane/window 230 is facing as the display system has a very large fov (e.g., 90 degrees up to 180 degrees) in which parallax is retained. While difficult to observe in the black and white image of FIG. 3, the display system 200 is effective in providing the infinity effect that is useful for providing imagery that appear to extend toward infinity with the combination of the magnifying lens and the display element (which is positioned less than the focal length of the magnifying lens away from the back/interior surface of the magnifying lens).

Figure 4:
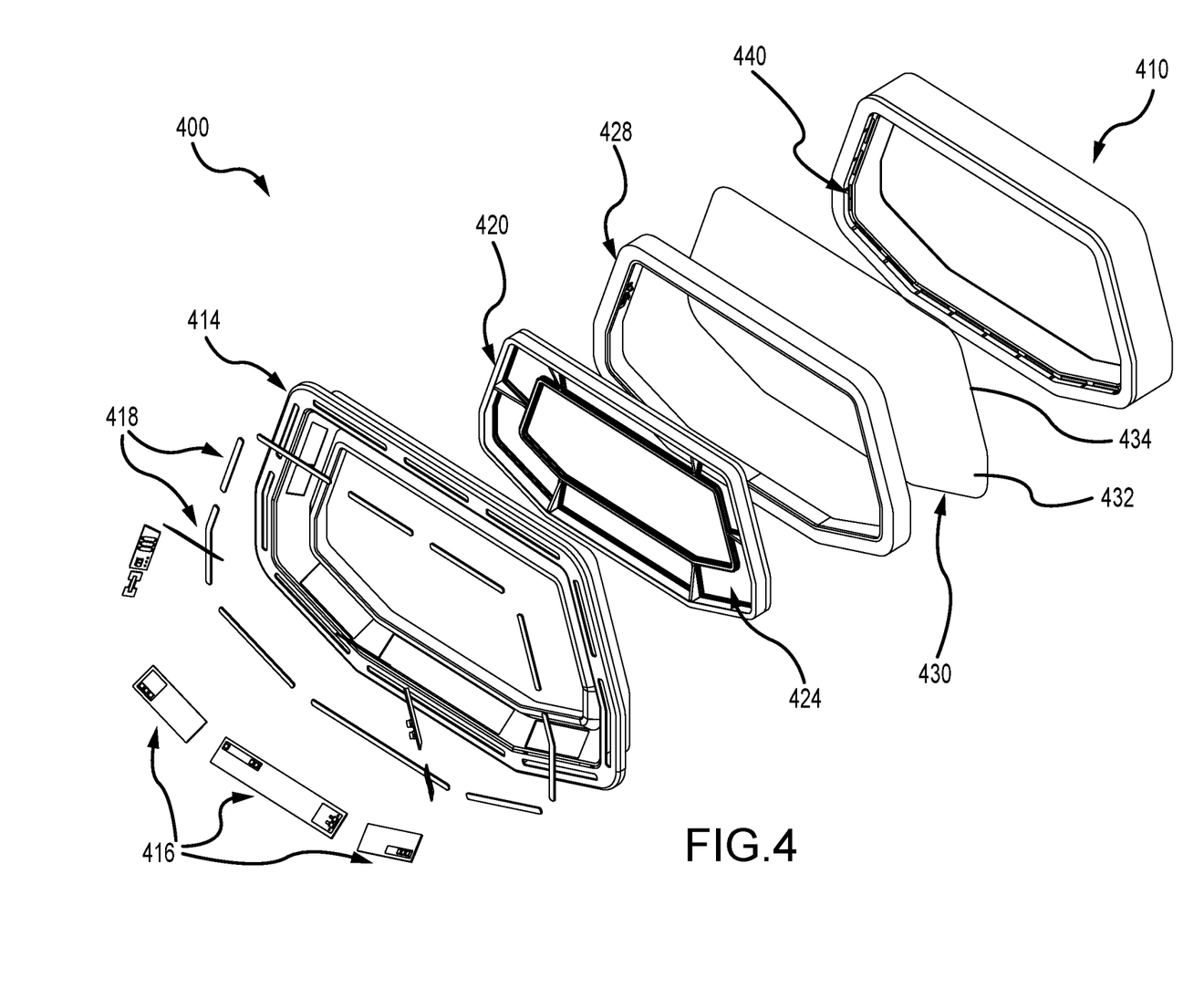
FIG. 4 is an exploded front perspective view of a shroud or frame assembly including a magnifying lens and an iris light assembly.

FIG. 4 is an exploded front perspective view of a shroud or frame assembly 400 including a magnifying lens 430 and an iris light assembly including lights 418 and 440. The assembly 400 includes several structural components configured to frame optical components to achieve the appearance of a window or portal for viewing spaces outside a room or viewing space in which viewers or observers would be located (e.g., a ship's portal or the like). The structural components also function to physically support and position the optical components and to provide a mechanism for mounting the optical components upon a wall or within an opening or hole in such a wall.

To these ends, the assembly includes a rear bezel or exterior frame member 410 defining a viewing opening or portal in its center portion and being configured for mounting the assembly 400 to a support wall (not shown but understood from FIGS. 1 and 2). The structural components further include a front or interior bezel or frame member 414 for supporting a portion of the iris light assembly, for providing a look and feel for the assembly to further the viewing window or portal effect or illusion obtained with support optical components, and for, again, providing a path for light to pass from internal components outward into a room/space including the assembly 400 (e.g., with a central opening or portal matching the size and shape, in some cases, of the one in the rear frame member 410). Sandwiched between the two bezels or frame members 410 and 414 the assembly 410 includes a magnifying lens support member or bezel 428 along with an exterior protective pane/lens support or frame member.

The optical components of the assembly 400 include a magnifying lens 430 with a front surface 432 facing outward or toward the front bezel 414 and a rear surface 434 facing the rear bezel 410. As discussed above, the magnifying lens 432 may take the form of a flat spherical Fresnel lens, and, in such cases, the surface 432 would include the ridges of the Fresnel lens while the back surface 434 would typically be smooth or planar. The magnifying lens 430 is sized and shaped to be received upon a mounting ledge on the back or interior portion of the interior bezel or frame member 428, and the location of this mounting ledge/surface combined with the depth of the walls of the rear bezel 410 help define the separation distance from the rear surface 434 of the lens 430 and a display surface/screen of a display element (or monitor) later positioned so as to be proximate to or about the rear edge of the rear bezel 410 (see FIG. 6). Further, the magnifying lens 430 is supported within the assembly 400 such that its rear surface 434 is parallel to a display element's front or display surface/screen when it is placed against the rear edge of bezel 410.

The optical components may optionally include a protective outer lens or pane 424, e.g., a tempered glass lens or the like, to provide a protective covering for the magnifying lens 430 and to hide its existence to observers and to allow users of the space to touch the window/portal provided by the assembly 400 and to allow the outer surface to readily be cleaned. Additionally, to provide an irising effect, the optical components may include rim lighting 440 on the rear bezel 410 provided about the periphery of the portal or hole in the bezel 410 and also may include rim lighting 418 on the front bezel 414 located about the periphery of the hole or portal in the bezel 414, with both lighting 418 and 440 facing outward into the space (or away from the rear bezel 410). The lighting 418 and 440 may take the form of a plurality of circular LEDs or elongated strip/bar LEDs of a single or multiple colors, and the lighting 418 and the lighting 440 may be operated concurrently or independently (typically, when a display element is operating to display a high contrast video image). The ship portal effect may further be enhanced by inclusion of one or more control and/or status panels 416 on exterior surfaces of the front bezel or frame member 414, and the panels 416 may include one or two functional component to allow user input to open or close the window/portal (e.g., to operate a motorized shutter blocking or allowing viewing of a display element through via the assembly 400) and a plurality of non-functional buttons and lights.

Figure 5:
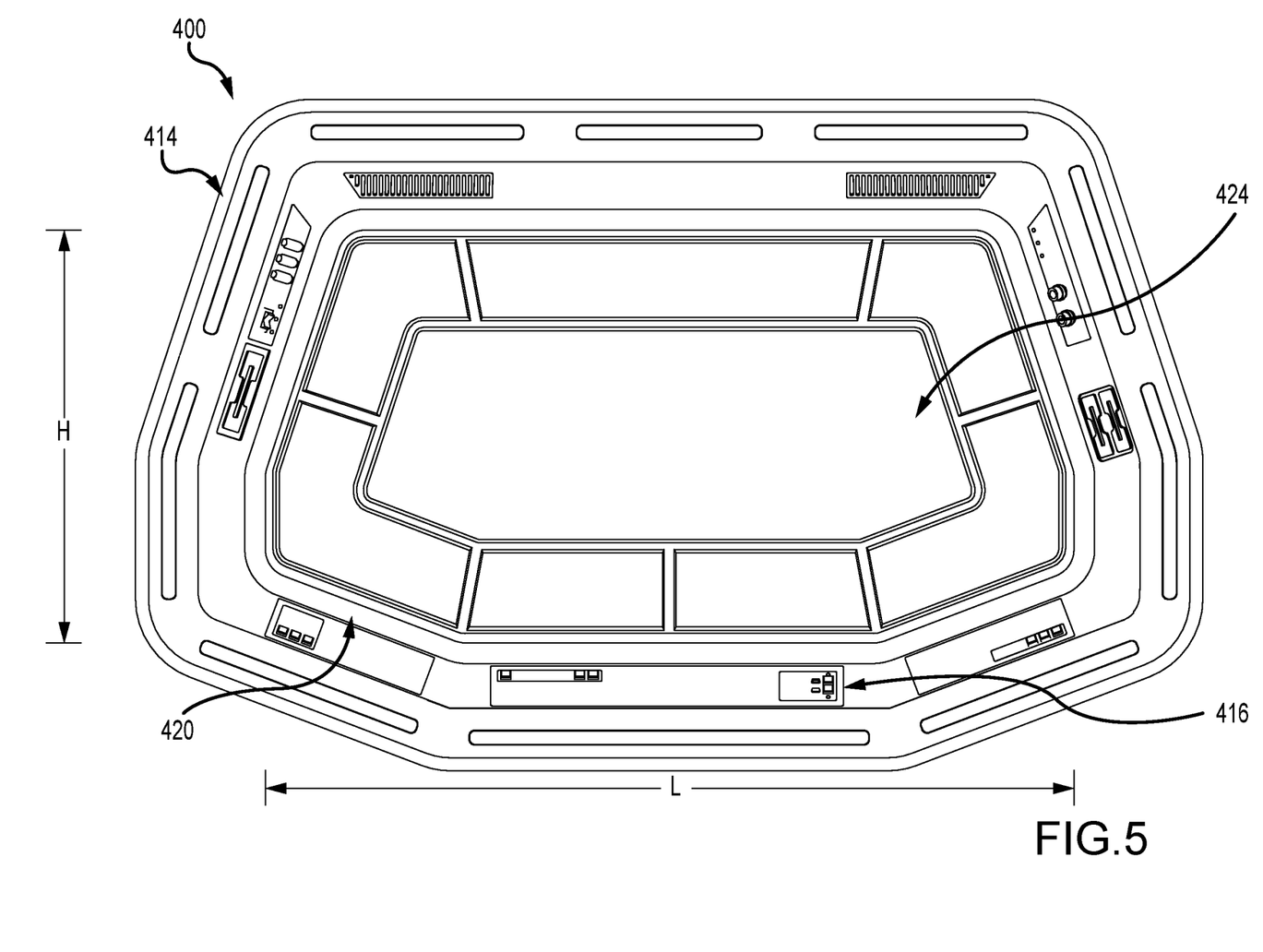
FIG. 5 is a front view (or viewing space or room-side view as would be seen by an observer or viewer) after assembly of the shroud or frame assembly of FIG. 4 but prior to insertion of an operating display element.
Figure 6:
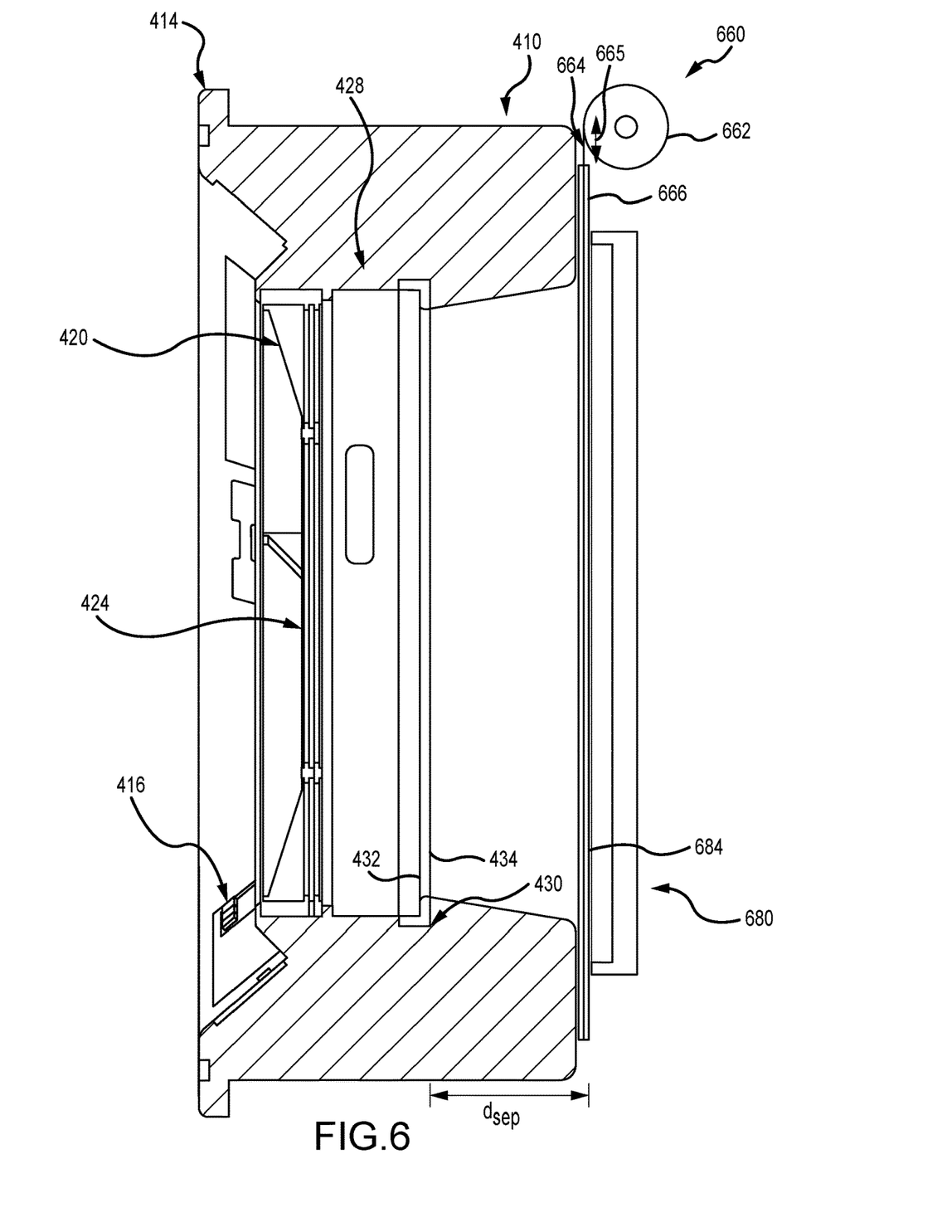
FIG. 6 is a side sectional view of a display system including the shroud or frame assembly with magnifying lens and iris light assembly of FIG. 4 along with a shutter assembly and display element.

FIG. 5 is a front view (or viewing space or room-side view as would be seen by an observer or viewer) after assembly of the shroud or frame assembly 400 of FIG. 4 but prior to insertion of an operating display element (as seen in FIG. 6). FIG. 5 is useful for showing that an observer of the assembly 400 would look through the opening/portal in the front bezel 414 and through the protective pane/covering 424 toward the magnifying lens 430. Concurrently, their eyes or view would be affected by the rim lighting 418 and 440 as these are about the periphery or rim of the portal/opening they are peering through, and the illusion may be enhanced by the provision of the control and/or status panels 416. The opening/portal has a length, L, and height, H, that may be relatively small (e.g., several inches each up to a foot or more) or, more typically, will be scaled up to be quite large, e.g., 3 to 4 feet or more height, H, and 4 to 7 feet or more in length, L, in some planned implementations.

FIG. 6 is a side sectional view of a display system including the shroud or frame assembly 400 with the magnifying lens 430 and iris light assembly of FIG. 4 along with a shutter assembly 660 and display element 680. The display element 680 is mounted onto or proximate the back edge of the rear bezel 410 with its display screen/surface 684 facing inward or toward the rear surface 434 of the magnifying lens 430. These two surfaces 684 and 434 are separated by a distance, $d_{sep}$, that is typically much less than the focal distance of the lens 430 (e.g., 8 to 12 inches for a Fresnel lens with a focal distance of 47.25 inches and similar ratios would be used with other lenses having the same or differing focal lengths).

A shutter assembly 660 is provided with a motorized roll 662 operable as shown by arrows 665 to move a shutter element 666 (e.g., a sheet of flexible, opaque material) between a first position between the lens 430 and the display surface/screen 684 (i.e., covering the screen 684 from view through the assembly 400) and a second position above the lens 430 and the display screen 684 (i.e., with the screen 684 fully visible through the assembly 400 via the lens 430). Hence, in the closed or down position, the screen element 666, as shown, is disposed between the lens 430 and the display element 680 and, in the open or up position, the screen element 666 is wholly or mostly placed upon a retention roll. The screen element 666 is sized and shaped to cover the entire opening/portal provided by the rear bezel 410 in most implementations.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the display element may be a display device using LCD, LED, OLED, or other display technology or using projection, with the display or projection technology chosen to provide a 4K or greater resolution. The size of the display element's display surface preferably is chosen to be at a proportion that provides at least 2 inches of "bleed" on all four sides in proportion to the faux window opening on the viewer/observer side of the display system.

We claim:

1. A display system for providing a wide field of view infinity effect, comprising:
  a frame assembly adapted for mounting on a wall of a viewing space;
  a display element with a display surface, wherein the display element operates to display an image upon the display surface; and
  a magnifying lens supported within the frame assembly with a rear surface facing the display surface of the display element and with a front surface facing outward into the viewing space when the frame assembly is mounted on the wall,
  wherein the rear surface of the magnifying lens is parallel to the display surface of the display element and is separated from the display surface by a separation distance less than a focal length of the magnifying lens, and wherein the separation distance has a value such that a ratio of the separation distance to the focal length is in the range of 0.084 to 0.339.

2. The display system of claim 1, wherein the separation distance has a value such that the ratio of the separation distance to the focal length is in the range of 0.169 to 0.254.

3. The display system of claim 1, wherein the magnifying lens comprises a Fresnel lens.

4. The display system of claim 3, wherein the Fresnel lens is provided in a planar plastic sheet to provide a flat spherical magnifying lens.

5. The display system of claim 4, wherein the Fresnel lens has a focal length of at least 47 inches and the separation distance is less than 12 inches.

6. The display system of claim 1, further comprising an iris light assembly including a plurality of light sources provided in the frame assembly at locations about a periphery of the magnifying lens, wherein the light sources output light in a direction away from the display element.

7. The display system of claim 1, wherein the display element provides the image with a brightness of at least 1000 nits.

8. The display system of claim 7, wherein the brightness is at least about 3500 nits.

9. The display system of claim 1, wherein the display element has a resolution of at least 4K.

10. The display system of claim 1, further comprising a controller operating the display element to display the image based on input content defining a video image with at least one brightly lit and moving object and with concurrently displayed first regions or objects that are brightly lit and second regions or objects that are dark, whereby high contrast is provided in the image.

11. The display system of claim 1, further comprising a controller operating the display element to display the image based on input content defining a video image with a frame rate of at least 60 frames per second.

12. A display system for providing a wide field of view infinity effect, comprising:
a display element with a display screen having a brightness of at least 3500 nits and a 4K or greater resolution; and
a flat and planar Fresnel lens with a rear surface facing and parallel to the display screen of the display element,
wherein the rear surface of the Fresnel lens is separated from the display surface by a separation distance less than a focal length of the Fresnel lens, and
wherein the separation distance has a value such that a ratio of the separation distance to the focal length is in the range of 0.084 to 0.339.

13. The display system of claim 12, wherein the separation distance has a value such that the ratio of the separation distance to the focal length is in the range of 0.169 to 0.254.

14. The display system of claim 12, further comprising a shutter assembly operating to place a shutter element in a first position and in as second position, wherein the shutter element in the first position covers the display screen blocking light from the display element from striking the rear surface of the Fresnel lens and wherein the shutter element in the second position uncovers the display screen whereby the light from the display element strikes the rear surface of the Fresnel lens.

15. The display system of claim 12, further comprising an iris light assembly including a plurality of light sources about a periphery of the magnifying lens, wherein the light sources output light in a direction away from the display element.

16. The display system of claim 12, further comprising a controller operating the display element to display a video image with at least one brightly lit and moving object and with concurrently displayed first regions or objects that are brightly lit and second regions or objects that are dark, whereby high contrast is provided in the image.

17. The display system of claim 12, further comprising a controller operating the display element to display video at a frame rate of at least 60 frames per second.

18. A display system for providing a wide field of view infinity effect, comprising:
a frame assembly adapted for mounting on a wall of viewing space;
a display element with a display surface, wherein the display element operates to display an image upon the display surface; and
a magnifying lens with a rear surface facing the display surface of the display element and with a front surface facing outward into a viewing space,
an iris light assembly including a plurality of light sources provided in the frame assembly at locations about a periphery of the magnifying lens,
wherein the light sources output light in a direction away from the display element,
wherein the rear surface of the magnifying lens is parallel to the display surface of the display element and is separated from the display surface by a separation distance less than a focal length of the magnifying lens,
wherein the separation distance has a value such that a ratio of the separation distance to the focal length is in the range of 0.084 to 0.339,
wherein the magnifying lens comprises a Fresnel lens, wherein the Fresnel lens is provided in a planar plastic sheet to provide a flat spherical magnifying lens, and
wherein the Fresnel lens has a focal length of at least 47 inches and the separation distance is less than 12 inches.

19. The display system of claim 18, wherein the separation distance has a value such that the ratio of the separation distance to the focal length is in the range of 0.169 to 0.254.

20. The display system of claim 18, further comprising a controller operating the display element to display the image based on input content defining a video image with at least one brightly lit and moving object and with concurrently displayed first regions or objects that are brightly lit and second regions or objects that are dark, whereby high contrast is provided in the image, or the controller operating the display element to display the image based on input content defining a video image with a frame rate of at least 60 frames per second.

21. A display system for providing a wide field of view infinity effect, comprising:
a frame assembly adapted for mounting on a wall of viewing space;
a display element with a display surface, wherein the display element operates to display an image upon the display surface; and
a magnifying lens supported within the frame assembly with a rear surface facing the display surface of the display element and with a front surface facing outward into the viewing space when the frame assembly is mounted on the wall, wherein the rear surface of the magnifying lens is parallel to the display surface of the display element and is separated from the display surface by a separation distance less than a focal length of the magnifying lens, wherein the magnifying lens comprises a Fresnel lens, wherein the Fresnel lens is provided in a planar plastic sheet to provide a flat spherical magnifying lens, and wherein the Fresnel lens has a focal length of at least 47 inches and the separation distance is less than 12 inches.

22. The display system of claim 21, further comprising an iris light assembly including a plurality of light sources provided in the frame assembly at locations about a periphery of the magnifying lens, wherein the light sources output light in a direction away from the display element.

23. The display system of claim 21, wherein the display element provides the image with a brightness of at least 1000 nits.

24. The display system of claim 23, wherein the brightness is at least about 3500 nits.

25. The display system of claim 21, wherein the display element has a resolution of at least 4K.

26. The display system of claim 21, further comprising a controller operating the display element to display the image based on input content defining a video image with at least one brightly lit and moving object and with concurrently displayed first regions or objects that are brightly lit and second regions or objects that are dark, whereby high contrast is provided in the image.

27. The display system of claim 21, further comprising a controller operating the display element to display the image based on input content defining a video image with a frame rate of at least 60 frames per second.

28. A display system for providing a wide field of view infinity effect, comprising:
   a display element with a display screen having a brightness of at least 3500 nits and a 4K or greater resolution;
   a flat and planar Fresnel lens with a rear surface facing and parallel to the display screen of the display element, wherein the rear surface of the Fresnel lens is separated from the display surface by a separation distance less than a focal length of the Fresnel lens; and
   a shutter assembly operating to place a shutter element in a first position and in as second position, wherein the shutter element in the first position covers the display screen blocking light from the display element from striking the rear surface of the Fresnel lens and wherein the shutter element in the second position uncovers the display screen whereby the light from the display element strikes the rear surface of the Fresnel lens.

29. The display system of claim 28, further comprising an iris light assembly including a plurality of light sources about a periphery of the magnifying lens, wherein the light sources output light in a direction away from the display element.

30. The display system of claim 28, further comprising a controller operating the display element to display a video image with at least one brightly lit and moving object and with concurrently displayed first regions or objects that are brightly lit and second regions or objects that are dark, whereby high contrast is provided in the image.

31. The display system of claim 28, further comprising a controller operating the display element to display video at a frame rate of at least 60 frames per second.

* * * * *